(12) United States Patent
Yamaguchi

(10) Patent No.: US 9,777,144 B2
(45) Date of Patent: Oct. 3, 2017

(54) AQUEOUS DISPERSION OF HOLLOW POLYMER PARTICLES AND METHOD OF PRODUCTION OF SAME

(71) Applicant: ZEON CORPORATION, Tokyo (JP)

(72) Inventor: Atsushi Yamaguchi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 14/775,276

(22) PCT Filed: Mar. 13, 2014

(86) PCT No.: PCT/JP2014/056661
§ 371 (c)(1),
(2) Date: Sep. 11, 2015

(87) PCT Pub. No.: WO2014/142237
PCT Pub. Date: Sep. 18, 2014

(65) Prior Publication Data
US 2016/0024290 A1 Jan. 28, 2016

(30) Foreign Application Priority Data
Mar. 15, 2013 (JP) ................................ 2013-053087

(51) Int. Cl.
*C08L 33/12* (2006.01)
*C08F 285/00* (2006.01)

(52) U.S. Cl.
CPC ............ *C08L 33/12* (2013.01); *C08F 285/00* (2013.01); *C08L 2205/025* (2013.01); *C08L 2205/035* (2013.01)

(58) Field of Classification Search
None
See application file for complete search history.

(56) References Cited

U.S. PATENT DOCUMENTS 5,360,827 A * 11/1994 Toda ................... C08F 285/00
521/57

FOREIGN PATENT DOCUMENTS

| JP | 06248012 A * | 9/1994 |
| JP | H10-182761 A | 7/1998 |
| JP | 2009-144029 A | 7/2009 |

OTHER PUBLICATIONS

Sep. 15, 2015 International Preliminary Report on Patentability issued in International Patent Application No. PCT/JP2014/056661.
Apr. 8, 2014 International Search Report issued in International Patent Application No. PCT/JP2014/056661.

* cited by examiner

*Primary Examiner* — Vickey Nerangis
(74) *Attorney, Agent, or Firm* — Oliff PLC

(57) ABSTRACT

A method of production of an aqueous dispersion of hollow polymer particles including forming, on the outer layers of core polymer particle (A) on which inside shell layer (B) and intermediate shell layer (C) are formed, outside shell layer (D) obtained by using a monomer mixture (d) with a ratio of content of an acidic group-containing monomer controlled to 0.15 wt % or less and adding a base to an aqueous dispersion of the obtained polymer particle to make the pH of the aqueous dispersion 7 or more is provided.

5 Claims, No Drawings

AQUEOUS DISPERSION OF HOLLOW POLYMER PARTICLES AND METHOD OF PRODUCTION OF SAME

TECHNICAL FIELD

The present invention relates to an aqueous dispersion of hollow polymer particles and a method of production of the same.

BACKGROUND ART

In recent years, the methods of printing books, magazines, and other publications; handbills, pamphlets, posters, and other commercial advertising; and other printed matter have become diversified. From the viewpoint of the adaptability to single color printing and multi color printing in a broad range of applications, improvement of the opacity and absorbability of the coated paper has been sought.

In the past, a coating composition which contains hollow polymer particles has been used for production of coated paper. For example, Patent Document 1 discloses a method of producing an aqueous dispersion of hollow polymer particles which comprises taking an aqueous dispersion which contains polymer particles having a three-layer structure of a core polymer particle (A), shell layer (B), and shell layer (C) by adding a base to make the pH 7 or more and to neutralize at least part of the acidic groups which are contained in the core polymer particle (A) and then forming pores at the inside of the core polymer particle (A).

When producing an aqueous dispersion of hollow polymer particles, for removing residual monomers in the aqueous dispersion derived from the polymerization reaction, steam stripping in which steam (saturated water vapor) is blown is suitably used but in the conventionally known method of production of an aqueous dispersion of hollow polymer particles, there were also the problems that the amount of the coagulum in the aqueous dispersion of hollow polymer particles after performing the polymerization step, base treatment step, and residual monomer removal step is relatively large, the filtration time for removing this coagulum by filtration is long, so the productivity is poor, and, further, the frequency of cleaning the polymerization reactor is high, so the work efficiency is poor.

PRIOR ART DOCUMENTS

Patent Documents

Patent Document 1: Japanese Patent Publication No. 2009-144029A

SUMMARY OF THE INVENTION

Problem to be Solved by the Invention

An object of the present invention is to provide a method of production of an aqueous dispersion of hollow polymer particles with little coagulum and an aqueous dispersion of hollow polymer particles which is produced by that method of production.

Means for Solving the Problems

The present inventors engaged in intensive research to solve the above problem and discovered that by forming hollow polymer particles by a four-layer structure of a core polymer particle (A), inside shell layer (B), intermediate shell layer (C), and outside shell layer (D) and using, as the monomer mixture (d) for forming the outside shell layer (D), one with a ratio of content of an acidic group-containing monomer of a specific amount or less, the above problem can be solved and thereby completed the present invention.

That is, according to the present invention, there is provided a method of production of an aqueous dispersion of hollow polymer particles which comprises copolymerizing a monomer mixture (a) so as to form a core polymer particle (A), copolymerizing a monomer mixture (b) in the presence of the core polymer particle (A) so as to form an inside shell layer (B) which substantially surrounds the core polymer particle (A), copolymerizing a monomer mixture (c) in the presence of the core polymer particle (A) on which the inside shell layer (B) is formed so as to form an intermediate shell layer (C) which substantially surrounds the inside shell layer (B), copolymerizing a monomer mixture (d) in the presence of the core polymer particle (A) on which the inside shell layer (B) and intermediate shell layer (C) are formed so as to form an outside shell layer (D) which substantially surrounds the intermediate shell layer (C), and adding a base to an aqueous dispersion which contains the core polymer particle (A) on which the inside shell layer (B), the intermediate shell layer (C), and the outside shell layer (D) are formed so as to make a pH of the aqueous dispersion 7 or more, wherein as the monomer mixture (d), one which has a ratio of content of the acidic group-containing monomer of 0.15 wt % or less is used.

In the method of production of the present invention, preferably the monomer mixture (a) is comprised of an acidic group-containing monomer 20 to 50 wt % and a monomer which can copolymerize with this 50 to 80 wt %, the monomer mixture (b) is comprised of an acidic group-containing monomer 1 to 10 wt % and a monomer which can copolymerize with this 90 to 99 wt %, and the monomer mixture (c) is comprised of an acidic group-containing monomer 0.2 to 2.5 wt % and a monomer which can copolymerize with this 97.5 to 99.8 wt %.

In the method of production of the present invention, preferably, as the monomer mixture (d), one which does not contain the acidic group-containing monomer is used.

In the method of production of the present invention, preferably as the monomer mixture (d), one which contains only an aromatic vinyl monomer is used.

In the method of production of the present invention, preferably the ratios of the monomer mixture (a), the monomer mixture (b), the monomer mixture (c), and the monomer mixture (d) are, by weight ratio of "monomer mixture (a)/monomer mixture (b)/monomer mixture (c)/monomer mixture (d)", (1 to 40)/(1 to 40)/(10 to 88)/(10 to 88).

Further, according to the present invention, there is provided an aqueous dispersion of hollow polymer particles which is produced by any of the above methods of production.

Effects of the Invention

According to the present invention, a method of production of an aqueous dispersion of hollow polymer particles with little coagulum and an aqueous dispersion of hollow polymer particles which is produced by the method of production can be provided.

DESCRIPTION OF EMBODIMENTS

The method of production of an aqueous dispersion of hollow polymer particles of the present invention is a method of obtaining polymer particles which have a four-layer structure of a core polymer particle (A), inside shell layer (B), intermediate shell layer (C), and outside shell layer (D) and adding a base to an aqueous dispersion of the polymer particles to make the pH 7 or more to thereby obtain an aqueous dispersion which includes hollow polymer particles.

Core Polymer Particle (A)

The core polymer particle (A) is formed by copolymerizing a monomer mixture (a) for forming the core polymer particle (A).

The monomers which are contained in the monomer mixture (a) for forming the core polymer particle (A) is not particularly limited, but one containing an acidic group-containing monomer 20 to 50 wt % and a monomer which can copolymerize with the acidic group-containing monomer 50 to 80 wt % is preferable.

The acidic group-containing monomer is a monomer which has a functional group which exhibits acidity. For example, acrylic acid, methacrylic acid, crotonic acid, cinnamic acid, and other ethylenically unsaturated monocarboxylic acids; itaconic acid, fumaric acid, maleic acid, butene tricarboxylic acid, and other ethylenically unsaturated polyvalent carboxylic acids; monobutyl fumarate, monobutyl maleate, and other partial esterified products of ethylenically unsaturated polyvalent carboxylic acids; styrene sulfonic acid and other sulfonic acid group-containing monomers; etc. may be mentioned. Among these as well, since the effect of the present invention becomes much more remarkable, ethylenically unsaturated monocarboxylic acid monomers are preferable, (meth)acrylic acid (indicating "acrylic acid and methacrylic acid", same below) is more preferable, and methacrylic acid is particularly preferable. Note that, these monomers may be used as single type alone or as two types or more combined.

In the monomer mixture (a), the ratio of content of the acidic group-containing monomer is preferably 20 to 50 wt %, more preferably 25 to 45 wt %. If the ratio of content of the acidic group-containing monomer is too small, in the later explained neutralization step, sometimes the base will have difficulty penetrating the core polymer particle (A) and formation of pores will become difficult. On the other hand, if the ratio of content is too great, sometimes the core polymer particle (A) will not be sufficiently surrounded by the inside shell layer (B) and the aqueous dispersion will fall in stability and coagulum will end up easily being formed.

The copolymerizable monomer need only be a monomer which can copolymerize with the acidic group-containing monomer. It is not particularly limited, but styrene, α-methylstyrene, p-methylstyrene, halogenated styrene, and other aromatic vinyl monomers; acrylonitrile, methacrylonitrile, and other ethylenically unsaturated nitrile monomers; methyl (meth)acrylate, ethyl (meth)acrylate, butyl (meth)acrylate, 2-ethylhexyl (meth)acrylate, lauryl (meth)acrylate, glycidyl (meth)acrylate, 2-hydroxyethyl (meth)acrylate, and other ethylenically unsaturated carboxylic acid ester monomers; (meth)acrylamide, N-methylol (meth) acrylamide, N-butoxymethyl (meth) acrylamide, and other ethylenically unsaturated carboxylic acid amide monomers; butadiene, isoprene, and other conjugated diene monomers; vinyl acetate and other carboxylic acid vinyl ester monomers; vinyl chloride and other halogenated vinyl monomers; vinylidene chloride and other halogenated vinylidene monomers; vinyl pyridine; etc. may be mentioned, but an ethylenically unsaturated carboxylic acid ester monomer is preferable, an ethylenically unsaturated monocarboxylic acid alkyl ester monomer is more preferable, and methyl (meth) acrylate and butyl (meth)acrylate are particularly preferable. Note that, as the number of carbon atoms of the alkyl group of the above ethylenically unsaturated monocarboxylic acid alkyl ester monomer, 1 to 6 is preferable. Further, these monomers may be used as single type alone or as two types or more combined.

In the monomer mixture (a), the ratio of content of the copolymerizable monomer is preferably 50 to 80 wt %, more preferably 55 to 75 wt %.

Further, in the present invention, as the monomers which form the monomer mixture (a), it is particularly preferable to use methyl methacrylate, butyl acrylate, and methacrylic acid in combination. The ratio of content is preferably methyl methacrylate 35 to 77 wt %, butyl acrylate 3 to 15 wt %, and methacrylic acid 20 to 50 wt %, more preferably methyl methacrylate 42 to 71 wt %, butyl acrylate 4 to 13 wt %, and methacrylic acid 25 to 45 wt %, particularly preferably methyl methacrylate 45 to 65 wt %, butyl acrylate 5 to 12 wt %, and methacrylic acid 30 to 43 wt %.

Further, the monomer mixture (a) may contain divinylbenzene, diallyl phthalate, allyl (meth)acrylate, ethyleneglycol di(meth)acrylate, and other cross-linkable monomers. However, if the amount of use of the cross-linkable monomer is too great, formation of pores at the inside of the core polymer particle (A) becomes difficult, so the amount of use is preferably made a range at which stable pore formation can be maintained. The amount of use of the cross-linkable monomer in the monomer mixture (a) is preferably 20 wt % or less, more preferably 10 wt % or less, particularly preferably 1 wt % or less.

The monomer mixture (a) is usually copolymerized in an aqueous medium. For this reason, the core polymer particle (A) which is obtained by copolymerization are usually obtained in the state of an aqueous dispersion. As the aqueous medium, usually water is used. To an extent not impairing the stability of dispersion of the polymer particles at the time of manufacture, methanol, ethanol, and other water-soluble organic solvents may be jointly used. The amount of use of the aqueous medium is usually 100 to 1000 parts by weight with respect to 100 parts by weight of the monomer mixture (a), preferably 200 to 600 parts by weight. If the amount of use of the aqueous medium is too small, the amount of formation of coagulum at the time of polymerization tends to increase, while if the amount of use of the aqueous medium is too large, the productivity of the hollow polymer particles tends to become inferior.

The copolymerization method of the monomer mixture (a) is not particularly limited, but usually is the emulsion polymerization method. The polymerization mode may be any of a batch type, semicontinuous type, or continuous type. The polymerization pressure, polymerization temperature, and polymerization time are not particularly limited. Known conditions are employed. At the time of emulsion polymerization, a surfactant, polymerization initiator, chain transfer agent, chelating agent, electrolyte, deoxidant, or various other additives which are generally used for an emulsion polymerization reaction may be used as secondary materials for polymerization.

As the surfactant which is used for the emulsion polymerization, a general known surfactant may be used. Specifically, potassium rosinate, sodium rosinate, and other rosinates; potassium oleate, potassium laurate, sodium laurate, sodium stearate, potassium stearate, and other fatty acid salts; sodium laurosulfate, and other sulfuric acid ester salts of aliphatic alcohols; sodium dodecylbenzene sulfonate, and other alkylaryl sulfonates; and other anionic surfactants, sodium polyoxyethylene alkyl ether sulfate and other alkylether sulfates; a polyethyleneglycol alkyl ester, alkyl ether, or alkyl phenyl ether, and other nonionic surfactant, polyacrylic acid, polymethacrylic acid, polyvinyl sulfonic acid, polyvinyl alcohol, polyvinyl pyrrolidone, polyethyleneglycol, and other hydrophilic synthetic polymer substance; gelatin, water-soluble starch, and other natural hydrophilic polymer substances; carboxymethylcellulose and other hydrophilic semisynthetic polymer substances; and other dispersion stabilizers etc. may be mentioned. These surfactants can be used alone or as two types or more combined. Among these as well, since the polymerization stability is excellent, sodium polyoxyethylene alkyl ether sulfate and other alkyl ether sulfate is preferable.

The amount of use of the surfactant is preferably 0.1 to 5 parts by weight with respect to 100 parts by weight of the monomer mixture (a), more preferably 0.5 to 3 parts by weight. If the amount of use of the surfactant is too small, coagulum is liable to be easily formed at the time of polymerization, while if too large, the porosity of the obtained hollow polymer particles becomes low and the various characteristics are liable to fall.

Further, the monomer mixture (a) is preferably copolymerized in the presence of seeds. By using seeds, control of the particle size of the core polymer particles which are produced can be made easy.

The polymerization conversion rate of the monomer mixture (a) in emulsion polymerization is usually 90 wt % or more, preferably 97 wt % or more. Further, the composition of the copolymer which is formed is usually substantially the same as the composition of the monomer mixture (a).

The method of addition of the surfactant at the time of emulsion polymerization is not particularly limited. The surfactant may be added to the reaction system all together or divided or continuously, but from the viewpoint of suppressing the formation of coagulum at the time of polymerization, the method of continuous addition to the reaction system is preferable. Further, the monomer mixture (a) and the surfactant may be mixed and added to the reaction system. Alternatively, they may be separately added to the reaction system, but the monomer mixture (a) and the surfactant are preferably mixed with the aqueous medium and added to the reaction system in the state of an emulsion.

Further, at the time of emulsion polymerization, the reaction system may be given an inorganic salt and the copolymerization performed in the presence of the inorganic salt. In particular, if jointly using a surfactant and inorganic salt, formation of coagulum at the time of polymerization can be effectively suppressed and the particle size distribution can be made narrower. The inorganic salt is not particularly limited, but, specifically, sodium chloride, potassium chloride, sodium sulfate, potassium sulfate, sodium nitrate, sodium carbonate, sodium hydrogencarbonate, potassium carbonate, sodium phosphate, sodium tripolyphosphate, and other alkali metal salts; calcium chloride, barium sulfate, and other alkali earth metal salts; aluminum sulfate, aluminum chloride, etc. may be mentioned. Among these as well, an alkali metal salt is preferable, and sodium tripolyphosphate is more preferable. The amount of use of the inorganic salt is preferably 0.01 to 1 part by weight with respect to 100 parts by weight of the monomer mixture (a), more preferably 0.05 to 0.5 part by weight. If the amount of use of the inorganic salt is too small, the effect of addition tends to become difficult to express, while if the amount of use is too great, coagulum is liable to easily form at the time of polymerization. Further, the method of addition of inorganic salts is not particularly limited, but addition to the reaction system all together, divided, or continuously is possible.

The volume average particle size of the core polymer particle (A) which is obtained by emulsion polymerization is preferably 100 to 600 nm, more preferably 250 to 500 nm. If the volume average particle size is too small, production of hollow polymer particles with a high porosity and large particle size tends to become difficult. On the other hand, if the volume average particle size is too large, covering the core polymer particle (A) by the inside shell layer (B) tends to become difficult and formation of pores in the core polymer particle (A) tends to become difficult.

Inside Shell Layer (B)

The inside shell layer (B) is layer which substantially surrounds the core polymer particle (A) and is formed by copolymerizing the monomer mixture (b) for forming the inside shell layer (B) in the presence of the core polymer particle (A).

The monomers which are contained in the monomer mixture (b) for forming the inside shell layer (B) are not particularly limited, but one which contains an acidic group-containing monomer 1 to 10 wt % and a monomer which can copolymerize with the acidic group-containing monomer 90 to 99 wt % is preferable.

The acidic group-containing monomer is not particularly limited. Ones which are similar to the above-mentioned core polymer particle (A) can be used, but an ethylenically unsaturated monocarboxylic acid monomer is preferable, (meth)acrylic acid is more preferable, and methacrylic acid is particularly preferable. In the monomer mixture (b), the ratio of content of the acidic group-containing monomer is preferably 1 to 10 wt %, more preferably 3 to 9 wt %, furthermore preferably 5 to 8 wt %.

Further, the copolymerizable monomer is not particularly limited. Ones which are similar to the above-mentioned core polymer particle (A) can be used. Among these, an ethylenically unsaturated carboxylic acid ester monomer is preferable, an ethylenically unsaturated monocarboxylic acid alkyl ester monomer is more preferable, methyl (meth)acrylate and butyl (meth)acrylate are furthermore preferable, and methyl methacrylate and butyl acrylate are particularly preferable. Note that, the number of carbon atoms in the alkyl groups of the above ethylenically unsaturated monocarboxylic acid alkyl ester monomer is preferably 1 to 6. Further, these monomers may be used as single type alone or as two types or more combined.

In the monomer mixture (b), the ratio of content of the copolymerizable monomer is preferably 90 to 99 wt %, more preferably 91 to 97 wt %, furthermore preferably 92 to 95 wt %.

Further, in the present invention, as the monomers which form the monomer mixture (b), use of methyl methacrylate, butyl acrylate, and methacrylic acid and/or acrylic acid in combination is particularly preferable. The ratios of content of these are preferably methyl methacrylate 68 to 89 wt %, butyl acrylate 10 to 22 wt %, and methacrylic acid and/or acrylic acid 1 to 10 wt %, more preferably methyl methacrylate 71 to 85 wt %, butyl acrylate 12 to 20 wt %, and methacrylic acid and/or acrylic acid 3 to 9 wt %, particularly preferably methyl methacrylate 74 to 81 wt %, butyl acrylate 14 to 18 wt %, and methacrylic acid and/or acrylic acid 5 to 8 wt %.

The method of copolymerizing the monomer mixture (b) in the presence of the core polymer particle (A) is not particularly limited, but the method of emulsion polymerization of the monomer mixture (b) in an aqueous dispersion of the core polymer particle (A) is preferable. By this, it is possible to obtain core polymer particle (A) on which inside shell layer (B) is formed. As the polymerization mode, any of a batch type, semicontinuous type, and continuous type may be used. Further, the polymerization pressure, polymerization temperature, and polymerization time are not particularly limited. Known conditions can be employed.

At the time of emulsion polymerization of the monomer mixture (b), the secondary materials for polymerization which are illustrated in the production of the core polymer particle (A) can be used. Further, at the time of emulsion polymerization of the monomer mixture (b), a chain transfer agent can be used in addition to the secondary materials for polymerization which are illustrated in the production of the core polymer particle (A). As the chain transfer agent, a known chain transfer agent which is used for general emulsion polymerization can be used. For example, octyl mercaptan, n-dodecyl mercaptan, t-dodecyl mercaptan, n-hexadecyl mercaptan, n-tetradecyl mercaptan, t-tetradecyl mercaptan, and other mercaptans; dimethylxantogen disulfide, diethylxantogen disulfide, diisopropylxantogen disulfide, and other xantogen disulfides; tetramethylthiuram disulfide, tetraethylthiuram disulfide, tetrabutylthiuram disulfide, and other thiuram disulfides; carbon tetrachloride, carbon tetrabromide, and other halogenated hydrocarbons; diphenylethylene, pentaphenylethane, α-methylstyrene dimer, and other hydrocarbons; acrolein, methacrolein, allyl alcohol, 2-ethylhexyl thioglycolate, terpinolein, α-terpinene, γ-terpinene, dipentene, etc. may be mentioned. These chain transfer agents may be used alone or as two or more types combined. Among these in particular, mercaptans and α-methylstyrene dimers are preferable, mercaptans are more preferable, and t-dodecyl mercaptan is particularly preferable.

Intermediate Shell Layer (C)

The intermediate shell layer (C) is layer which substantially surrounds the inside shell layer (B) and is formed by copolymerizing the monomer mixture (c) for forming the intermediate shell layer (C) in the presence of core polymer particle (A) on which the inside shell layer (B) is formed.

The monomers which are included in the monomer mixture (c) for forming the intermediate shell layer (C) are not particularly limited, but an acidic group-containing monomer 0.2 to 2.5 wt % and monomer which is copolymerizable with the acidic group-containing monomer 97.5 to 99.8 wt % are preferably included.

The acidic group-containing monomer is not particularly limited. Ones which are similar to the above-mentioned core polymer particle (A) can be used, but an ethylenically unsaturated monocarboxylic acid monomer is preferable, and (meth)acrylic acid is more preferable. In the monomer mixture (c), the ratio of content of the acidic group-containing monomer is preferably 0.2 to 2.5 wt %, more preferably 0.3 to 2.2 wt %, furthermore preferably 0.4 to 1.8 wt %.

Further, the copolymerizable monomer is not particularly limited. Ones which are similar to the above-mentioned core polymer particle (A) can be used. Among these in particular, an aromatic vinyl monomer and ethylenically unsaturated monocarboxylic acid ester monomer are preferable, an aromatic vinyl monomer is more preferable, and styrene is particularly preferable. In the monomer mixture (c), the ratio of content of the copolymerizable monomer is preferably 97.5 to 99.8 wt %, more preferably 97.8 to 99.7 wt %, furthermore preferably 98.2 to 99.6 wt %.

Further, in the present invention, as the monomers which form the monomer mixture (c), use of methacrylic acid and/or acrylic acid and styrene in combination is particularly preferable. The ratios of content of these are preferably methacrylic acid and/or acrylic acid 0.2 to 2.5 wt % and styrene 97.5 to 99.8 wt %, more preferably methacrylic acid and/or acrylic acid 0.3 to 2.2 wt % and styrene 97.8 to 99.7 wt %, particularly preferably methacrylic acid and/or acrylic acid 0.4 to 1.8 wt % and styrene 98.2 to 99.6 wt %.

The method of copolymerizing the monomer mixture (c) in the presence of core polymer particle (A) on which the inside shell layer (B) is formed is not particularly limited, but the method of emulsion polymerization of the monomer mixture (c) in an aqueous dispersion of the core polymer particle (A) on which the inside shell layer (B) is formed is preferable. By this, core polymer particle (A) on which inside shell layer (B) and intermediate shell layer (C) are formed can be obtained. The polymerization mode may be any of a batch type, semicontinuous type, or continuous type. Further, the polymerization pressure, polymerization temperature, and polymerization time are not particularly limited. Known conditions can be employed. At the time of emulsion polymerization of the monomer mixture (c), secondary materials for polymerization illustrated in the production of the core polymer particle (A) and formation of the inside shell layer (B) can be used.

Outside Shell Layer (D)

The outside shell layer (D) is layer which substantially surrounds the intermediate shell layer (C) and is formed by copolymerizing the monomer mixture (d) for forming the outside shell layer (D) in the presence of core polymer particle (A) on which the inside shell layer (B) and intermediate shell layer (C) are formed. Here, in the present invention, when forming the outside shell layer (D), as the monomer mixture (d) for forming the outside shell layer (D), one in which the ratio of content of the acidic group-containing monomer is 0.15 wt % or less is used.

In the present invention, in this way, at the outer layers of the core polymer particle (A) on which the inside shell layer (B) and intermediate shell layer (C) are formed, outside shell layer (D) which is obtained by using a monomer mixture (d) with a ratio of content of an acidic group-containing monomer controlled to 0.15 wt % or less is further formed. Due to this, an aqueous dispersion of hollow polymer particles with little amount of coagulum can be obtained after performing the polymerization step, base treatment step, and residual monomer removal step.

Further, by further forming the outside shell layer (D), for example, when using steam stripping to remove the residual monomers, it becomes possible to reduce the amount of use of steam which is required for reducing the amount of residual monomers to a desired level.

In the monomer mixture (d), the ratio of use of the acidic group-containing monomer is 0.15 wt % or less, preferably 0.1 wt % or less, more preferably 0.05 wt % or less, particularly preferably the ratio of content of the acidic group-containing monomer is made substantially zero. That is, as the monomer mixture (d), one not containing an acidic group-containing monomer is preferable. Here, the acidic group-containing monomer is a monomer which has a functional group which exhibits acidity. As representative ones, the ones illustrated in the above-mentioned core polymer particle (A) etc. may be mentioned. If the ratio of content of the acidic group-containing monomer is too high, an aqueous dispersion of hollow polymer particles with a small amount of coagulum becomes difficult to obtain.

Further, the monomers other than the acidic group-containing monomer which are contained in the monomer mixture (d) are not particularly limited, but styrene, α-methylstyrene, p-methylstyrene, halogenated styrene, and other aromatic vinyl monomers; acrylonitrile, methacrylonitrile, and other ethylenically unsaturated nitrile monomers; methyl (meth)acrylate, ethyl (meth)acrylate, butyl (meth) acrylate, 2-ethylhexyl (meth)acrylate, lauryl (meth)acrylate, glycidyl (meth)acrylate, 2-hydroxyethyl (meth)acrylate, and other ethylenically unsaturated carboxylic acid ester monomers; (meth)acrylamide, N-methylol (meth) acrylamide, N-butoxymethyl (meth) acrylamide, and other ethylenically unsaturated carboxylic acid amide monomers; butadiene, isoprene, and other conjugated diene monomers; vinyl acetate and other carboxylic acid vinyl ester monomers; vinyl chloride and other halogenated vinyl monomers; vinylidene chloride and other halogenated vinylidene monomers; vinylpyridine; etc. may be mentioned. These monomers may be used as single type alone or as two types or more combined.

However, since an aqueous dispersion of hollow polymer particles with a small amount of coagulum becomes easy to obtain, an aromatic vinyl monomer is preferable, and styrene is more preferable.

Furthermore, as the monomer mixture (d), use of one which contains only an aromatic vinyl monomer is more preferable, while use of one which contains only styrene is particularly preferable.

The method of copolymerizing the monomer mixture (d) in the presence of the core polymer particle (A) on which inside shell layer (B) and intermediate shell layer (C) are formed is not particularly limited, but the method of emulsion polymerization of the monomer mixture (d) in an aqueous dispersion of the core polymer particle (A) on which inside shell layer (B) and intermediate shell layer (C) are formed is preferable. Due to this, core polymer particle (A) on which inside shell layer (B), intermediate shell layer (C), and outside shell layer (D) are formed can be obtained. The polymerization mode may be any of a batch type, semicontinuous type, or continuous type. Further, the polymerization pressure, polymerization temperature, and polymerization time are not particularly limited. Known conditions can be employed. At the time of emulsion polymerization of the monomer mixture (d), secondary materials for polymerization illustrated in the production of the core polymer particle (A) and formation of the inside shell layer (B) and intermediate shell layer (C) can be used.

In the present invention, the weight ratio of the monomer mixtures for forming the core polymer particle (A), inside shell layer (B), intermediate shell layer (C), and outside shell layer (D) is a weight ratio of the "monomer mixture (a)/ monomer mixture (b)/monomer mixture (c)/monomer mixture (d)" of preferably (1 to 40)/(1 to 40)/(10 to 88)/(10 to 88), more preferably (2 to 30)/(2 to 30)/(20 to 76)/(20 to 76), particularly preferably (5 to 20)/(5 to 20)/(30 to 60)/(30 to 60). If the weight ratio of the monomer mixtures for forming the core polymer particle (A), inside shell layer (B), intermediate shell layer (C), and outside shell layer (D) is in the above range, the effect of the present invention becomes much more remarkable.

Base Treatment

Next, the base treatment in the method of production of the present invention will be explained. In base treatment, a base is added to the aqueous dispersion of the core polymer particle (A) on which the inside shell layer (B), intermediate shell layer (C), and outside shell layer (D) are formed which is obtained by the above method. Due to this, the pH of the aqueous dispersion is made 7 or more, whereby at least part of the acidic groups which are contained in the core polymer particle (A) are neutralized and thereby pores are formed. Further, due to this, in the method of production according to the present invention, an aqueous dispersion of hollow polymer particles inside of which pores are formed can be obtained.

The base may be either a volatile base and nonvolatile base, but as specific examples of the volatile base, ammonia, ammonium hydroxide, morpholine, trimethylamine, triethylamine, etc. may be mentioned. Further, as specific examples of the nonvolatile base, sodium hydroxide, potassium hydroxide, lithium hydroxide, and other alkali metal hydroxides; calcium hydroxide, magnesium hydroxide, and other alkali earth metal hydroxides; sodium carbonate, potassium bicarbonate, and other alkali metal (bi)carbonates; ammonium carbonate, ammonium bicarbonate, and other ammonium (bi)carbonates etc. may be mentioned. Among these in particular, a volatile base is preferable, while ammonia and ammonium hydroxide are more preferable.

The amount of use of the base is not particularly limited so long as an amount which can neutralize at least part of the acidic groups of the core polymer particle (A) and make the pH of the aqueous dispersion 7 or more. Further, when adding the base, from the viewpoint of suppressing the formation of coagulum at the time of addition, addition in the state of an aqueous solution is preferable. The concentration in the aqueous solution at that time is preferably 0.5 to 20 wt %, more preferably 1 to 10 wt %. Further, at this time, from the viewpoint of suppressing the formation of coagulum at the time of neutralization treatment, before adding the base, an anionic surfactant and/or nonionic surfactant may be added.

Further, the treatment time when performing the base treatment need only be the time which is required for the base to sufficiently disperse to the insides of the core polymer particle (A). Usually, it may be suitably selected in the range of 5 to 120 minutes, preferably 10 to 90 minutes. Further, the temperature at the time of base treatment is, from the viewpoint of dispersion of the base, preferably made at least the temperature at which the core polymer particle (A) sufficiently soften, particularly preferably 70 to 95° C.

Note that, in the method of production of the present invention, the formation of the core polymer particle (A), the formation of the inside shell layer (B), the formation of the intermediate shell layer (C), the formation of the outside shell layer (D), and the base treatment may be performed in the same reactor in stages. Alternatively, after a step of previous stage, the product which is obtained at the step of previous stage may be transferred to another reactor to set it in a state for the step of next stage.

Next, in the method of production of the present invention, to remove the residual monomers which are contained in the aqueous dispersion of hollow polymer particles which is obtained in this way, it is preferable to blow steam (saturated water vapor) into the aqueous dispersion for steam stripping. As the steam stripping, a conventionally known method can be used without limitation. Further, at the time of steam stripping, the treatment should be performed under conditions giving a ratio of content of residual monomers which are contained in the aqueous dispersion of hollow polymer particles of preferably 0.01 wt % or less.

Further, after removing the residual monomers by steam stripping, if necessary, it is also possible to adjust the pH or solid content concentration of the aqueous dispersion.

The aqueous dispersion of hollow polymer particles which is obtained by the method of production of the present invention in this way has a number average particle size of hollow polymer particles of preferably 0.6 to 1.5 μm, more preferably 0.8 to 1.4 μm, furthermore preferably 0.9 to 1.3 μm. The number average particle size of hollow polymer particles can be found, for example, by using a transmission electron microscope to measure 200 hollow polymer particles for maximum particle sizes and obtaining the simple average of the same.

Further, the porosity of the hollow polymer particles is preferably 30 to 65%, more preferably 40 to 60%, furthermore preferably 45 to 55%. The porosity of the hollow polymer particles can be found by using a transmission electron microscope to measure 200 hollow polymer particles for maximum particle size and maximum size of pores and obtaining the simple average of the porosities which are obtained from the measurement results.

The aqueous dispersion of hollow polymer particles which are obtained by the method of production of the present invention, as explained above, is obtained by further forming, on the outside layers of core polymer particle (A) on which the inside shell layer (B) and intermediate shell layer (C) are formed, outside shell layer (D) which are obtained by using a monomer mixture (d) with a ratio of content of an acidic group-containing monomer which is controlled to 0.15 wt % or less. Due to this, it becomes possible to obtain an aqueous dispersion of hollow polymer particles with little amount of coagulum after performing the polymerization step, base treatment step, and residual monomer removal step. Further, due to this, either there is no need to remove the coagulum in the aqueous dispersion or the filtration time for removing the coagulum is short, so the productivity is good and, further, the frequency of cleaning the polymerization reactor also becomes smaller, so the work efficiency is also excellent.

The aqueous dispersion of hollow polymer particles which is obtained by the method of production of the present invention can, for example, be mixed with calcium carbonate, clay, barium sulfate, calcium carbonate, talc, titanium oxide, Satin White, aluminum hydroxide, silica, mica, and other inorganic pigments and be used as a coating composition. Further, such a coating composition can be coated on paper to form a surface coating layer and thereby obtain coated paper. Further, the thus obtained coated paper contains the above-mentioned hollow polymer particles, so is excellent in opacity and hygroscopicity, etc. Making use of such characteristics, it can be suitably used for books, magazines, and other publications or handbills, pamphlets, posters, and other commercial printed matter.

EXAMPLES

Below, examples will be given to explain the present invention in further detail, but the present invention is not limited to these examples. Note that, unless otherwise indicated, "parts" are based on weight.

Further, the tests and evaluations were conducted by the following methods.

Volume Average Particle Size of Core Polymer Particles

The volume average particle size of the core polymer particles was found by using a dynamic light scattering method particle size measuring apparatus (product name "N4", made by Coulter) and using the volume-based particle size distribution of the core polymer particles as the basis to find the average particle size calculated as an arithmetic average (referred to as "volume average particle size").

Number Average Particle Size of Hollow Polymer Particles

The number average particle size of the hollow polymer particles was found by using a transmission electron microscope (product name "H-7500", made by Hitachi) to measure 200 hollow polymer particles for maximum particle size and obtaining the simple average of the measurement results.

Porosity of Hollow Polymer Particles

A transmission electron microscope (product name "H-7500", made by Hitachi) was used to measure 200 hollow polymer particles for maximum particle size and maximum size of pores. The measured values were used in the following formula (1) to find the porosities of the hollow polymer particles. The simple average of these was obtained and that value defined as the porosity of the hollow polymer particles.

$$\text{Porosity}(\%) = \{(\text{Maximum size of pores})^3 / (\text{Maximum particle size})^3\} \times 100 \quad (1)$$

Amount of Residual Monomers of Aqueous Dispersion of Hollow Polymer Particles (Amount of Residual Styrene)

To 5 g of the aqueous dispersion of hollow polymer particles, ion exchanged water 30 g and an internal standard constituted by toluene 0.02 g were added, then stirred for 30 minutes to obtain a sample for measurement of amount of residual monomers. Next, the obtained sample for measurement of amount of residual monomers 0.05 g was charged into a gas chromatograph (product name "GC-2010Plus", made by Shimadzu Corporation) to find the ratio of amount of residual monomers (amount of residual styrene) to the sample for measurement of amount of residual monomers 0.05 g (units: wt %).

Amount of Formation of Coagulum of Aqueous Dispersion of Hollow Polymer Particles An aqueous dispersion which contains hollow polymer particles corresponding to a total solid content of 150 g was filtered by a #200 wire mesh. The residue which remained on the wire mesh was rinsed, then dried at 105° C. for 4 hours. Next, the ratio of the dry weight of the residue on the wire mesh with respect to the total solid content of 150 g used for the filtration was found as a percentage and evaluated as the amount of formation of coagulum (units: wt %).

Filtration Property of Aqueous Dispersion of Hollow Polymer Particles

To an aqueous solution of hollow polymer particles, ion exchanged water and 10 wt % sodium hydroxide aqueous solution were added to adjust the solid content concentration to 26 wt % and the pH to 8.5, then the mixture was filtered by a #200 wire mesh and the result used as the sample for measurement of the filtration property. Next, the obtained sample for measurement of the filtration property was run through an SUS liquid transport pipe provided with a pressure meter at a flow rate of 50 mL per minute. At the outlet of the pipe, a polypropylene nonwoven fabric filter for trapping 30 μm particles (product name "Astro Pore PPECG30SWOG12", made by Fuji Film) which was punched out to a disk shape of a diameter of 25 mm was set.

Further, the total filtered amount of the filtration property sample from right after the start of transport of the filtration property sample to when the filter clogged and the inside pressure of the piping reached a gauge pressure of 100 kPa was measured. This was used as an indicator of the filtration property.

The larger the value of the total filtration amount, the smaller the amount of formation of small particle size coagulum which cannot be removed even by a #200 wire mesh.

Example 1

Production of Core Polymer Particle (A)

To a reaction vessel equipped with a stirring device, methyl methacrylate 50 parts, butyl acrylate 10 parts, methacrylic acid 40 parts, sodium polyoxyethylene alkyl ether sulfate 0.9 part, sodium tripolyphosphate 0.15 part, and ion exchanged water 80 parts were charged, then stirred to prepare an emulsion of a monomer mixture (a-1) for forming core polymer particle.

Next, separate from the above, to a reaction vessel equipped with a stirring device, ion exchanged water 800 parts, methyl methacrylate 100 parts, sodium dodecylbenzene sulfonate 5 parts, and potassium persulfate 5 parts were charged and stirred, then the reaction vessel was raised in temperature to 80° C. to perform a polymerization reaction to thereby obtain a volume average particle size 82 nm seed latex (S-1).

Further, to a reaction vessel equipped with a stirring device, the above obtained seed latex (S-1) 0.28 part (converted to solid content) was charged and raised in temperature to 85° C. Next, to the reaction vessel, a 3 wt % potassium persulfate aqueous solution 1.63 parts was added, then the reaction temperature was held at 85° C. while an amount corresponding to 7 wt % of the entire amount of the emulsion of the monomer mixture (a-1) which was obtained above was continuously added to the reaction vessel over 3 hours, then the mixture was further reacted for 1 hour.

Next, the reaction vessel was charged with ion exchanged water 250 parts and a 3 wt % potassium persulfate aqueous solution 18.6 parts. While holding the reaction temperature at 85° C., the remainder of the emulsion of the monomer mixture (a-1) which was obtained above was continuously added to the reaction vessel over 3 hours, then was further caused to react for 2 hours. After that, the reaction vessel was cooled down to room temperature to thereby obtain an aqueous dispersion containing the core polymer particle (A). Note that, the polymerization conversion rate was 99 wt % or more and the volume average particle size of the core polymer particle (A) was 420 nm.

Preparation of Monomer Mixtures

To a reaction vessel equipped with a stirring device, monomers 100 parts (methyl methacrylate 78 wt %, butyl acrylate 16 wt %, methacrylic acid 6 wt %), sodium polyoxyethylene alkyl ether sulfate 0.2 part, and ion exchanged water 160 parts were charged then stirred to thereby prepare the emulsion of a monomer mixture (b-1) for forming the inside shell layer (B).

Separate from the above, to a reaction vessel equipped with a stirring device, monomers 100 parts (styrene 99.0 wt %, methacrylic acid 1.0 wt %), sodium polyoxyethylene alkyl ether sulfate 0.6 part, and ion exchanged water 80 parts were charged then stirred to thereby prepare the emulsion of a monomer mixture (c-1) for forming the intermediate shell layer (C).

Furthermore, separate from the above, to a reaction vessel equipped with a stirring device, a monomer 100 parts (styrene 100.0 wt %), sodium polyoxyethylene alkyl ether sulfate 0.49 part, and ion exchanged water 73.2 parts were charged then stirred to thereby prepare the emulsion of a monomer mixture (d-1) for forming the outside shell layer (D).

Formation of Inside Shell Layer (B), Intermediate Shell Layer (C), and Outside Shell Layer (D)

Further, to a reaction vessel equipped with a stirring device, an aqueous dispersion which contains ion exchanged water 130 parts and the above obtained core polymer particle (A) was charged to give a weight of core polymer particle (A) of about 10 parts (that is, to given an amount of monomer mixture (a-1) used of 10 parts) and was raised to 85° C. in temperature. Next, to the reaction vessel, a 4 wt % potassium persulfate aqueous solution 10 parts was added, then, while holding the reaction vessel at 85° C., an emulsion of the monomer mixture (b-1) for forming the inside shell layer (B) (amount of monomer mixture (b-1) 10 parts) was continuously added to the reaction vessel over 20 minutes to polymerize it and form the inside shell layer (B).

Next, while holding the reaction vessel at 85° C., an emulsion of the monomer mixture (c-1) for forming the intermediate shell layer (C) (amount of monomer mixture (c-1) 49 parts) was continuously added to the reaction vessel over 65 minutes to polymerize it and form the intermediate shell layer (C).

Furthermore, while holding the reaction vessel at 85° C., an emulsion of the monomer mixture (d-1) for forming the outside shell layer (D) (amount of monomer mixture (d-1) 41 parts) was continuously added to the reaction vessel over 55 minutes to polymerize it and form the outside shell layer (D).

Base Treatment

After the above-mentioned method was used to form the inside shell layer (B), intermediate shell layer (C), and outside shell layer (D) in that order, the reaction vessel was filled with 5 wt % ammonia water 25 parts and treated by base treatment at 90° C. for 1 hour to form pores by the base. Note that, the pH of the reaction solution was 7 to 12 over the 1 hour during the neutralization treatment.

Further, the reaction vessel was cooled down to room temperature and the concentration of solid content was adjusted to 10 wt % to obtain an aqueous dispersion of hollow polymer particles.

Removal of Residual Monomers (Residual Monomer Removal Step)

Next, an internal volume 200 liter evaporation tank was charged with the thus obtained aqueous dispersion of hollow polymer particles 100 kg. Steam (saturated water vapor) was blown in from the bottom part of the evaporation tank to thereby perform steam stripping. Note that, in the present example, the steam stripping was performed until the amount of residual monomers (amount of residual styrene) became 0.01 wt % or so. At this time, the amount of steam introduced into the evaporation tank was 0.13 kg for 10 kg of total solid content, while the amount of residual monomer (amount of residual styrene) after steam stripping was 0.007 wt %.

Further, the thus obtained aqueous dispersion of hollow polymer particles after the stream stripping (after performing residual monomer removal step) was measured and evaluated for number average particle size of hollow polymer particles, porosity, amount of residual monomer (amount of residual styrene) in the aqueous dispersion of hollow polymer particles, amount of formation of coagulum, and filtration property. The results are shown in Table 1.

Example 2

To a reaction vessel equipped with a stirring device, monomers 100 parts (styrene 99.0 wt %, acrylic acid 1.0 wt %), sodium polyoxyethylenealkylether sulfate 0.6 part, and ion exchanged water 80 parts were charged and then stirred to prepare an emulsion of a monomer mixture (c-2) for forming the intermediate shell layer (C).

Further, except for changing the amount of the emulsion of the monomer mixture (a-1) for forming the core polymer particle (A) from the monomer mixture (a-1) 10 parts to the monomer mixture (a-1) 11.5 parts and using a monomer mixture for forming the intermediate shell layer (C) constituted by, instead of the emulsion of the monomer mixture (c-1) (amount of monomer mixture (c-1) 49 parts), the above prepared emulsion of the monomer mixture (c-2) (amount of monomer mixture (c-2) 49 parts), the same procedure was followed as in Example 1 to obtain an aqueous dispersion of hollow polymer particles.

Next, the obtained aqueous dispersion of hollow polymer particles was treated in the same way as in Example 1 by steam stripping to give an amount of residual monomers (amount of residual styrene) of 0.01 wt % or so. Note that, at this time, the amount of steam introduced into the evaporation tank was 0.11 kg for 10 kg of total solid content, while the amount of residual monomers (amount of residual styrene) after steam stripping was 0.008 wt %. Further, the thus obtained aqueous dispersion of hollow polymer particles after steam stripping (after performing residual monomer removal step) was evaluated in the same way as in Example 1. The results are shown in Table 1.

Comparative Example 1

To a reaction vessel equipped with a stirring device, methyl methacrylate 60 parts, butyl acrylate 5 parts, methacrylic acid 35 parts, sodium polyoxyethylenealkylether sulfate 0.9 part, sodium tripolyphosphate 0.15 part, and ion exchanged water 80 parts were charged and then stirred to thereby prepare an emulsion of the monomer mixture (a-2) for forming the core polymer particles.

Further, separate from this, to a reaction vessel equipped with a stirring device, monomers 100 parts (styrene 99.3 wt %, methacrylic acid 0.7 wt %), sodium polyoxyethylenealkylether sulfate 0.6 part, and ion exchanged water 80 parts were charged and stirred to thereby prepare an emulsion of the monomer mixture (c-3) for forming the intermediate shell layer (C).

Further, except for using a monomer mixture for forming the core polymer particle (A) constituted by, instead of the emulsion of the monomer mixture (a-1) (amount of monomer mixture (a-1) 10 parts), the above prepared emulsion of the monomer mixture (a-2) (amount of monomer mixture (a-2) 10 parts), for using a monomer mixture for forming the intermediate shell layer (C) constituted by, instead of the emulsion of the monomer mixture (c-1) (amount of monomer mixture (c-1) 49 parts), the above prepared emulsion of the monomer mixture (c-3) (amount of monomer mixture (c-3) 90 parts), and for not forming the outside shell layer (D), the same procedure was followed as in Example 1 to obtain an aqueous dispersion of hollow polymer particles.

Next, the obtained aqueous dispersion of hollow polymer particles was treated in the same way as in Example 1 by steam stripping to give an amount of residual monomer (amount of residual styrene) of 0.01 wt % or so. Note that, at this time, the amount of steam introduced into the evaporation tank was 1.14 kg for 10 kg of total solid content, while the amount of residual monomers (amount of residual styrene) after steam stripping was 0.012 wt %. Further, the thus obtained aqueous dispersion of hollow polymer particles after steam stripping was evaluated in the same way as in Example 1. The results are shown in Table 1.

Comparative Example 2

In the above-mentioned Comparative Example 1, the amount of residual monomers (amount of residual styrene) did not become 0.01 wt % or less as a result of the steam stripping, so in Comparative Example 2, an aqueous dispersion of hollow polymer particles was obtained under the same conditions as Comparative Example 1 and the steam stripping was continued until the amount of introduction of steam to the evaporation tank became 5.04 kg for 10 kg of total solid content. As a result, the amount of residual monomer (amount of residual styrene) after the steam stripping was 0.007 wt %. Further, the aqueous dispersion of hollow polymer particles after steam stripping (after performing residual monomer removal step) which was obtained in this way was evaluated in the same way as Example 1. The results are shown in Table 1.

Comparative Example 3

To a reaction vessel equipped with a stirring device, monomers 100 parts (styrene 99.3 wt %, acrylic acid 0.7 wt %), sodium polyoxyethylenealkylether sulfate 0.6 part, and ion exchanged water 80 parts were charged, then stirred to prepare an emulsion of a monomer mixture (c-4) for forming the intermediate shell layer (C).

Further, except for using a monomer mixture for forming the intermediate shell layer (C) constituted by, instead of the emulsion of the monomer mixture (c-1) (amount of monomer mixture (c-1) 49 parts), the above prepared emulsion of the monomer mixture (c-4) (amount of monomer mixture (c-4) 90 parts) and for not forming the outside shell layer (D), the same procedure was followed as in Example 1 to obtain an aqueous dispersion of hollow polymer particles.

Next, in Comparative Example 3 as well, the obtained aqueous dispersion of hollow polymer particles was treated in the same way as Example 1 for steam stripping of the amount of residual monomer (amount of residual styrene). When the amount of introduction of steam to the evaporation tank became 7.16 kg for 10 kg of the total solid content, the amount of residual monomer (amount of residual styrene) failed to become 0.01 wt % or so, so the steam stripping was ended at this point of time. Note that, the amount of residual monomers after the steam stripping (after performing residual monomer removal step) (residual styrene amount) was 0.020 wt %. Further, the aqueous dispersion of hollow polymer particles after steam stripping which was obtained in this way was evaluated in the same way as Example 1. The results are shown in
Table 1.

TABLE 1

| | | Example | | Comparative Example | | |
|---|---|---|---|---|---|---|
| | | 1 | 2 | 1 | 2 | 3 |
| Composition of monomer mixture (a) (wt %) | | | | | | |
| Core polymer particle (A) | Methyl methacrylate | 50 | 50 | 60 | 60 | 50 |
| | Butyl acrylate | 10 | 10 | 5 | 5 | 10 |
| | Methacrylic acid | 40 | 40 | 35 | 35 | 40 |
| | Amount of use of monomer mixture (a) (parts) | 10 | 11.5 | 10 | 10 | 10 |

TABLE 1-continued

Table 1

|  |  | Example | | Comparative Example | | |
|---|---|---|---|---|---|---|
|  |  | 1 | 2 | 1 | 2 | 3 |
|  | Composition of monomer mixture (b) (wt %) | | | | | |
| Inside shell layer (B) | Methyl methacrylate | 78 | 78 | 78 | 78 | 78 |
| | Butyl acrylate | 16 | 16 | 16 | 16 | 16 |
| | Methacrylic acid | 6 | 6 | 6 | 6 | 6 |
| | Amount of use of monomer mixture (b) (parts) | 10 | 10 | 10 | 10 | 10 |
| | Composition of monomer mixture (c) (wt %) | | | | | |
| Intermediate shell layer (C) | Styrene | 99.0 | 99.0 | 99.3 | 99.3 | 99.3 |
| | Methacrylic acid | 1.0 | — | 0.7 | 0.7 | — |
| | Acrylic acid | — | 1.0 | — | — | 0.7 |
| | Amount of use of monomer mixture (c) (parts) | 49 | 49 | 90 | 90 | 90 |
| | Composition of monomer mixture (d) (wt %) | | | | | |
| Outside shell layer (D) | ST (styrene) | 100 | 100 | — | — | — |
| | Amount of use of monomer mixture (d) (parts) | 41 | 41 | — | — | — |
| Residual monomer removal treatment | | | | | | |
| Amount of steam introduced (kg/10 kg of total solid content) | | 0.13 | 0.11 | 1.14 | 5.04 | 7.16 |
| Hollow polymer particles | | | | | | |
| Number average particle size (μm) | | 1.2 | 1.1 | 1.2 | 1.2 | 1.0 |
| Porosity (%) | | 52 | 51 | 52 | 52 | 49 |
| Aqueous dispersion of hollow polymer particles | | | | | | |
| Amount of residual monomers (%) | | 0.007 | 0.008 | 0.012 | 0.007 | 0.020 |
| Amount of formation of coagulum (%) | | 0.0077 | 0.0083 | 0.0153 | 0.0178 | 0.0190 |
| Total filtered amount (g) | | 117 | 118 | 58 | 49 | 32 |

From Table 1, in Examples 1 and 2 which produced aqueous dispersions of hollow polymer particles by further forming, at the outer layers of the core polymer particle (A) on which the inside shell layer (B) and intermediate shell layer (C) are formed, outside shell layer (D) which are obtained by using a monomer mixture (d) with a ratio of content of the acidic group-containing monomer which is controlled to 0.15 wt % or less, it was possible to lower the amount of introduction of steam which was required for removal of the residual monomers. Further, in these Example 1 and Example 2, the amount of formation of coagulum after stream stripping (after performing residual monomer removal step) was small, the filtration property was excellent, and the productivity was excellent.

On the other hand, in Comparative Examples 1 to 3 where the outside shell layer (D) were not formed, the amount of introduction of steam which was required for removal of the residual monomers ended up becoming larger. Furthermore, in these Comparative Examples 1 to 3, the amount of formation of coagulum after stream stripping (after performing residual monomer removal step) was great, the filtration property was poor, and the productivity was poor.

The invention claimed is:

1. A method of production of an aqueous dispersion of hollow polymer particles comprising:
   copolymerizing a monomer mixture (a) so as to form a core polymer particle (A),
   copolymerizing a monomer mixture (b) in the presence of the core polymer particle (A) so as to form an inside shell layer (B) which substantially surrounds the core polymer particle (A),
   copolymerizing a monomer mixture (c) in the presence of the core polymer particle (A) on which the inside shell layer (B) is formed so as to form an intermediate shell layer (C) which substantially surrounds the inside shell layer (B),
   copolymerizing a monomer mixture (d) in the presence of the core polymer particle (A) on which the inside shell layer (B) and intermediate shell layer (C) are formed so as to form an outside shell layer (D) which substantially surrounds the intermediate shell layer (C), and
   adding a base to an aqueous dispersion which contains the core polymer particle (A) on which the inside shell layer (B), the intermediate shell layer (C), and the outside shell layer (D) are formed so as to make a pH of the aqueous dispersion 7 or more,
   wherein as the monomer mixture (d), one which has a ratio of content of the acidic group-containing monomer of 0.15 wt % or less is used.

2. The method of production of an aqueous dispersion of hollow polymer particles as set forth in claim 1, wherein
   the monomer mixture (a) is comprised of an acidic group-containing monomer 20 to 50 wt % and a monomer which can copolymerize with this 50 to 80 wt %,
   the monomer mixture (b) is comprised of an acidic group-containing monomer 1 to 10 wt % and a monomer which can copolymerize with this 90 to 99 wt %, and
   the monomer mixture (c) is comprised of an acidic group-containing monomer 0.2 to 2.5 wt % and a monomer which can copolymerize with this 97.5 to 99.8 wt %.

3. The method of production of an aqueous dispersion of hollow polymer particles as set forth in claim 1, wherein as the monomer mixture (d), one which does not contain the acidic group-containing monomer is used.

4. The method of production of an aqueous dispersion of hollow polymer particles as set forth in claim 1, wherein as the monomer mixture (d), one which contains only an aromatic vinyl monomer is used.

5. The method of production of an aqueous dispersion of hollow polymer particles as set forth in claim 1, wherein the ratios of the monomer mixture (a), the monomer mixture (b), the monomer mixture (c), and the monomer mixture (d) are, by weight ratio of "monomer mixture (a)/monomer mixture (b)/monomer mixture (c)/monomer mixture (d)", (1 to 40)/(1 to 40)/(10 to 88)/(10 to 88).

* * * * *